Nov. 10, 1959

J. KRITZ 2,911,826

FLOWMETER

Filed July 29, 1955

INVENTOR.
Jack Kritz

BY

ATTORNEYS

Nov. 10, 1959   J. KRITZ   2,911,826
FLOWMETER

Filed July 29, 1955   2 Sheets-Sheet 2

INVENTOR.
Jack Kritz
BY
Moses, Nolte & Nolte
Attorneys

United States Patent Office 2,911,826
Patented Nov. 10, 1959

2,911,826
FLOWMETER

Jack Kritz, Flushing, N.Y.

Application July 29, 1955, Serial No. 525,212

12 Claims. (Cl. 73—194)

The present invention relates to the measurement of the flow of a fluid and particularly to the measurement of the rate of mass flow or the total mass flow of a fluid through a pipe or duct or other container.

In my previous copending application Serial No. 437,360, filed June 17, 1954, now Patent No. 2,869,357, I have disclosed apparatus for measuring the density of a fluid and in my applications, Serial No. 67,503, filed December 27, 1948, now Patent No. 2,826,912, Serial No. 209,295, filed February 3, 1951, now abandoned, Serial No. 209,296, filed February 3, 1951, now abandoned, Serial No. 374,358, filed August 14, 1953, now Patent No. 2,831,348, and Serial No. 474,403, filed December 10, 1954, I have disclosed electroacoustic apparatus for measuring the volumetric rate of flow of a fluid. This application is a continuation-in-part of the above mentioned applications. According to the present invention, the mass of the fluid flowing through a pipe or duct is measured, regardless of the manner in which the flow occurs or the changes in the density of the fluid, and a continuous indication is given of the rate of mass flow as well as the total mass flow of the fluid for any given period.

According to this invention, the mass of a fluid flowing through a pipe or other duct is measured by apparatus which comprises a first pair of electroacoustic transducers located on opposite sides of the pipe or in any other suitable manner for transmitting acoustic waves through the fluid in one direction. The electroacoustic transducers are connected by a feedback path of a type disclosed in my previous applications. The feedback path may include a carrier wave generator connected to the transmitting transducer and a receiving means preferably including an amplifier connected to the receiving transducer, the carrier wave generator being controlled by the waves received by the receiving means so as to produce a continuous train of pulses of carrier waves. A second pair of electroacoustic transducers may be located on opposite sides of the pipe and interconnected by a second feedback path for transmitting pulses of carrier waves through the fluid in a second direction different from the direction in which the first waves are transmitted. Each feedback path thereby produces a continuous train of pulses of carrier wave oscillations having a pulse repetition frequency corresponding to the velocity of propagation of the waves in the fluid. A circuit is connected to the two feedback paths for producing a series of pulses having a pulse repetition rate proportional to the flow velocity of the fluid. These pulses are used to trigger a rectangular wave generator. Another electroacoustic transducer is mounted in the pipe or duct in acoustic contact with the fluid and is supplied with constant frequency oscillations. An inductor is connected in series with the transducer for resonating said transducer, which may be a piezoelectric crystal. The amplitude of the oscillations applied by the oscillator is stabilized by a suitable stabilizing circuit. The voltage across the piezoelectric crystal is detected to produce a voltage corresponding to the acoustic impedance of the fluid. This voltage is used to clamp a square wave having the same frequency as the pulses in one of the feedback paths. From the clamped square wave a D.C. voltage proportional to the density of the fluid is derived and used to clamp the amplitude of the rectangular wave produced by the rectangular wave generator. The duration of the rectangular pulse is constant. The repetition rate of the rectangular pulses, being proportional to the difference between the pulse repetition frequencies in the two feedback paths, is proportional to the flow velocity of the fluid, while the amplitude of the rectangular pulses is clamped to a value proportional to the density of the fluid. These rectanguar pulses are then fed through a suitable coupling circuit such as a cathode follower to any desired utilization circuit or a meter which measures the average current of said pulses and therefore indicates the rate of mass flow of the fluid. The rectangular pulses are also fed to a suitable integrating circuit or computer which measures the total mass flow of the fluid during any desired period. The integrating or computing circuit may include a first and second condenser each connected in the plate circuit of an electron tube to which the rectangular pulses are supplied. Means are provided for clamping one of the condensers to a point of fixed potential while leaving the other condenser free to charge in response to the pulses. The potential of the charging condenser is compared by any suitable comparing circuit to a fixed reference voltage. When the potential on the charging condenser reaches the fixed reference voltage, an output pulse is produced which operates means for unclamping the other condenser. The charges on the condensers are measured by a counter which may be operated in response to the output pulses of the comparing circuit. Thus, the two condensers are unclamped and charged alternately so that continuous charging can occur, without an interruption during the time required for the counting and the discharging of the condensers. The condensers may be alternately connected to the fixed potential clamping means by a relay. In order to prevent an interruption of the charging of the condensers while the relay is changing over, additional means are provided for instantaneously unclamping the condenser about to be charged and holding said condenser unclamped until the relay operates.

An object of the present invention is to measure the rate of mass flow, or the total mass flow, or both of a fluid.

Another object of the invention to derive signals representing the gravimetric as well as the volumetric flow of a fluid.

Aonther object of the invention is to continuously measure and indicate the rate of mass flow or the total mass flow of a fluid and to provide such measurements and indications over a wide range of velocities of flow.

Another object of the invention is to correctly measure the mass flow of a fluid despite any variations in the flow velocity or even pulsations of the flow.

Another object of the invention is to provide mass flow measurements of a fluid over an extended range with a linear scale and with a high accuracy over the full scale.

A still further object of the invention is to measure and indicate the mass flow of a fluid through a pipe without appreciably impairing the flow or increasing the pressure drop in the pipe.

A still further object of the invention is to provide means for measuring the rate of flow or the total flow of a fluid through a pipe over a wide range of velocities without appreciable error due to changes of velocity, temperature, or other variables.

Other objects and advantages of the invention will be apparent from the following detailed description and the accompanying drawing in which:

Fig. 1 is a block diagram of one embodiment of the invention;

Fig. 3 is a diagram of a wave produced by the clamping circuit in the density measuring portion of the apparatus.

Figure 2:
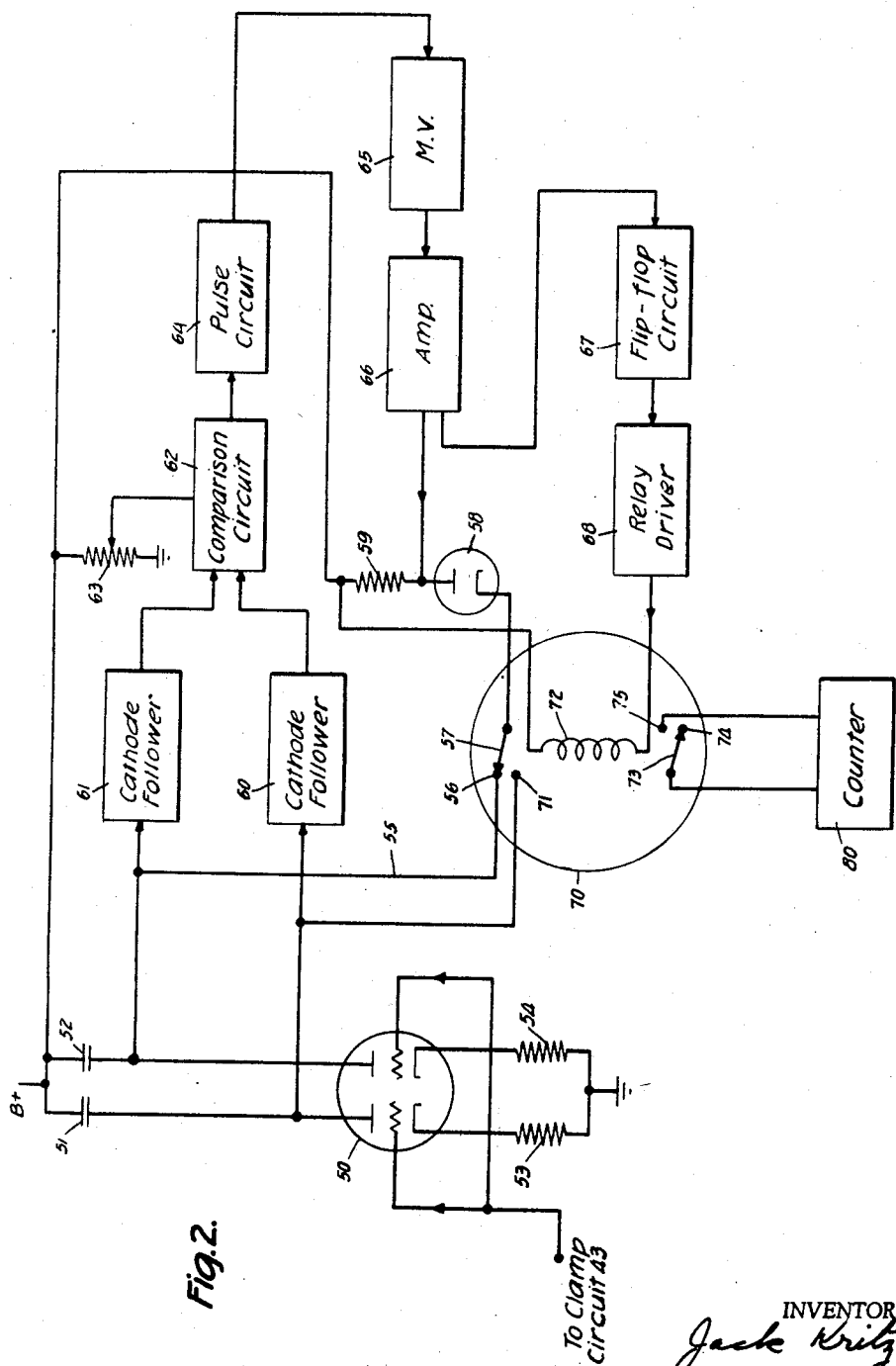
Fig. 2 is a schematic diagram of the apparatus for computing the total mass flow of the fluid.

Referring to Fig. 1, there is shown a fluid conduit 10 through which a fluid stream is adapted to flow, say in the direction of the arrow 11. A pair of transducers such as piezoelectric crystals 12 and 13 are mounted on opposite sides of the conduit or pipe 10 facing each other so that acoustic waves may be transmitted from the piezoelectric crystal 12 toward the crystal 13 in the direction of the arrow 14. The crystals 12 and 13 are interconnected by a feedback path consisting of an amplifier 15, a detector 16 and a modulator 17 supplied by a carrier generator or oscillator 18.

The feedback path and the transducer arrangement herein shown are merely illustrative and transducers and feedback paths of other types such as disclosed in any of my copending applications mentioned above, may be used. A second pair of electroacoustic transducers preferably in the form of piezoelectric crystals 19 and 20 are located in the conduit or pipe 10 for transmitting acoustic waves through the fluid in the direction indicated by the arrow 21. The receiving transducer 20 is connected through a feedback path to the transmitting transducer 19, which feedback path may consist of an amplifier 22, a detector 23, a modulator 24 and an oscillator 25. The electrical oscillations received by amplifiers 15 and 22 are supplied to their respective detectors 16 and 23, the outputs of which control the modulators 17 and 24 so as to permit or prevent the transmission of oscillations to the transmitting transducers 12 and 19. In this manner, continuous trains of pulses are transmitted through the fluid in the directions 14 and 21. As is fully explained in my copending applications, the pulse repetition frequency $f_2$ of the pulses in the feedback path 22, 23 will be proportional to $V+X \cos \phi$, while the pulse repetition frequency $f_1$ of the pulses through the feedback path 15, 16 will be proportional to $V-X \cos \phi$, where V is the propagation velocity, X is the flow velocity and $\phi$ is the angle between the flow velocity and the direction or propagation of the waves in the fluid.

The pulse outputs of detectors 16 and 23 are fed over connections 26 and 27 to a suitable combining circuit which may include a mixer 39, a demodulator 40 having a low pass filter and a pip generator 41. The output of the combining circuit will be a series of pulses having a repetition rate proportional to $f_2-f_1$.

These pulses are fed to a multi-vibrator 42, which generates a rectangular pulse of fixed duration in response to each output pulse of the combining circuit. Since $f_2-f_1$ is proportional to X, the multi-vibrator repetition frequency will also be proportional to X, the stream velocity.

The rectangular pulses from multi-vibrator 42 are supplied to a clamping circuit 43 of any known type which clamps the amplitude of the rectangular pulses to the value of a voltage supplied by a detector 34. This voltage is made proportional to the density of the fluid by a circuit which will now be described.

The circuit for obtaining a voltage proportional to the fluid density includes a piezoelectric crystal transducer 30 mounted preferably on one wall of the container or pipe 10 parallel to crystal 12. A constant frequency oscillator 31 is connected to the transducer 30 through an inductor 32 which series resonates the transducer. When the crystal transducer 30 is tuned precisely to series resonance, the voltage drop across the crystal is substantially a linear function of the acoustic impedance of the fluid, $\rho V$, where $\rho$ is the density of the fluid and V is the wave propagation velocity, as is explained more fully in my copending application, Serial No. 437,360, filed June 17, 1954, now Patent No. 2,869,357. The voltage across the crystal 30 is impressed on a detector 33. The output of detector 33 is fed to the stabilized oscillator 31 for compensating for the resistance of inductor 32. The details of oscillator 31 and detector 33 are fully shown and described in my copending application 437,360, now Patent No. 2,869,357 and corresponding British patent 771,637.

The output voltage of detector 33, or a selected portion of this voltage, is applied to an amplitude control terminal of oscillator 31 so that the output of the oscillator is increased by an amount equal to the magnitude of the output voltage of the detector divided by the Q of the inductor 32. The voltage output of detector 33 is substantially proportional to $\rho V_1+C$, where $$V_1 = V - X \cos \theta$$

and $\rho V_1$ is the acoustic impedance of the fluid and C is a constant due to the crystal mounting. Generally X is sufficiently small relative to V so that $V_1$ may be replaced by V. The output of detector 33 is applied to a clamping circuit 35 adapted to clamp a square wave supplied thereto by a multi-vibrator 28. The multi-vibrator 28 has a connection to the lead 26 and is thus supplied with pulses at a frequency $f_1$. The multi-vibrator 28, therefore, supplies to the clamp circuit 35 a square wave 29 having a period proportional to $$\frac{1}{V_1}$$

where $V_1$ is the velocity of propagation of the acoustic waves along path 14 in the fluid. The clamp circuit 35 clamps the amplitude of the square waves to a value proportional to $\rho V_1+C$. In order to derive the square wave shown in Fig. 3 having an amplitude proportional to $\rho V_1$ and a pulse duration proportional to $$\frac{1}{V_1}$$

the clamped square waves from clamp circuit 35 are impressed on a cathode follower 36 having a steady cathode bias equal to C. The output of cathode follower 36 is fed to an integrator 37, which produces a triangular wave 38 having a peak amplitude proportional to the product of $$\rho V_1 \text{ and } \frac{1}{V_1}$$

that is, proportional to the density, $\rho$, of the fluid. The triangular wave 38 is fed to a detector 34 preferably of the voltage doubling type which produces a D.C. voltage proportional to $\rho$. The output of detector 34 is then fed to the clamping circuit 43 which clamps the amplitude of the rectangular wave from the multi-vibrator 42 to an amplitude corresponding to the density of the fluid. Thus, the rectangular output wave from clamp circuit 43 has an amplitude substantially proportional to the density, $\rho$, and a repetition rate proportional to the stream velocity X. The above-described circuits 31—37 are shown and described in detail in my British Patent 771,637. Clamp circuit 43 may be similar to clamp circuit 35, which is fully disclosed in the British patent.

The rectangular waves from clamp circuit 43 are fed through a suitable coupling circuit such as a cathode follower 44 to means for measuring the rate of mass flow and is fed also to means for measuring the total mass flow of the fluid through the pipe 10. It will be evident that in order to measure the rate of mass flow it is only necessary now to measure the average current of the train of rectangular pulses and such a rate meter 45 is shown connected to the cathode follower 44. In order to measure the total mass flow of the fluid it is necessary to measure the total charge of all the rectangular pulses. Integrating circuits for accomplishing the integration of a series of pulses are well known and any such circuit may be used. Accordingly, a suitable integrator 46 is connected to the output of the clamp circuit 43 and the output of the integrator 46 is supplied to a device 47 of any type capable of measuring or counting the integrated charges. The outputs of cathode follower 44 and integrator 46 may also be supplied to other apparatus, such as, for example, apparatus for controlling the flow of the fluid.

Fig. 2 shows a circuit for integrating or computing the clamped rectangular pulses produced by circuit 43. The computing circuit comprises a pair of electron devices such as a dual triode 50 having a pair of anodes connected to a source of B+ voltage through condensers 51 and 52. The cathodes of tube 50 are connected to ground through resistors 53 and 54 which are sufficiently large to insure that the plate current follows the grid potential with good fidelity. One of the condensers 51 and 52 is clamped at a fixed potential while the other is free to charge in response to the incoming rectangular wave. The clamping circuit for condenser 52 extends over the connection 55 through the contacts 56 and 57, diode 58 and the resistor 59 to the B+ source. The lower end of condenser 52 is thus clamped at a fixed positive potential. The junction between the anodes of tube 50 and condensers 51 and 52 are connected separately to cathode followers 60 and 61. The outputs of both cathode followers 60, 61 are supplied to a voltage comparison circuit 62 to which a reference potential is also supplied from a voltage divider 63 connected to the same B+ source as condensers 51 and 52. When the potential of the charging condenser 51 reaches the reference voltage, the comparison circuit 62 becomes conductive. Comparison circuit 62 may be a pair of diodes having their anodes connected to the reference potential and their cathodes each connected to the outputs of the cathode followers 60 and 61. Comparison circuit 62 controls a pulse generating circuit 64, which produces an output pulse when the comparison circuit becomes conductive. Pulse circuit 64 is connected to a one-shot multi-vibrator 65.

The output of multi-vibrator 65 is fed to a flip-flop or Eccles-Jordan circuit 67 coupled to a relay driver or amplifier 68. The relay driver 68 alternately energizes and de-energizes the winding 72 of relay 70 in response to successive pulses from the flip-flop circuit 67. The winding 72 may operate a pair of double throw switch arms 57 and 73. When the contact arm 57 is in the position shown the condenser 52 is clamped and when it throws to contact 71 condenser 51 is clamped to a fixed voltage. This reversal of clamping occurs whenever one of the condensers is charged to a predetermined voltage, representing a predetermined mass of fluid flow.

The winding 72 also operates a switch 73, 74, 75 which opens and closes the input circuit of any suitable counter 80, such as an electromechanical counter. Thus each count will represent the quantity of fluid mass corresponding to the charging of both condensers 51 and 52 to the fixed voltage. The total count obviously indicates the total mass flow of the fluid.

The reversal of the condenser clamping by the relay necessarily requires a certain amount of time, due to the fact that the relay 70 cannot be operated instantaneously. If a lapse of time occurs between the moment when one condenser, 51 or 52, is charged to the reference voltage and the moment when the other condenser is unclamped, an error would occur. In order to provide instantaneous unclamping of the uncharged condenser, the amplifier 66 impresses a negative pulse on the anode of diode 58 when multi-vibrator 65 is triggered. This action cuts-off diode 58 and unclamps the clamped integrating condenser. This preliminary unclamping action is maintained for a time sufficient to allow the switch arm 57 to throw over. The duration of the preliminary unclamping action may be readily set by adjusting the time constants of multi-vibrator 65 to cause it to produce a pulse of the required duration.

It will be understood by those skilled in the art that many variations and modifications of the invention may be made without departing from the invention, the spirit and scope of which are defined in the following claims.

I claim:

1. Apparatus for measuring the mass flow of a fluid comprising first means for producing a first electrical quantity proportional to the acoustic impedance of the fluid, second means for producing a second electrical quantity inversely proportional to the propagation velocity of acoustic waves in the fluid, third means for producing a third electrical quantity proportional to the velocity of flow of the fluid and fourth means interconnecting and responsive to said first, second and third means, for combining said first, second and third electrical quantities and producing therefrom an electrical quantity proportional to the product thereof and means responsive to said last-mentioned electrical quantity for measuring and indicating the mass flow of the fluid.

2. Apparatus according to claim 1, said fourth means including means responsive to the first and second means for producing a fourth electrical quantity proportional to the density of the fluid.

3. Apparatus according to claim 2, wherein the means for producing said fourth electrical quantity produces pulses each having an amplitude proportional to the acoustic impedance of the fluid and a duration proportional to the reciprocal of the velocity of the acoustic waves in the fluid, and said fourth means produces pulses having an amplitude proportional to the fourth electrical quantity and a repetition rate proportional to the velocity of flow of the fluid.

4. Apparatus for measuring the mass flow of a fluid comprising a pipe through which said fluid is adapted to flow, a first pair of transducers comprising a transmitting transducer and a receiving transducer located on opposite sides of said pipe, first means interconnecting said transducers for transmitting acoustic waves in one direction through the fluid from the transmitting transducer to the receiving transducer and for producing oscillations having a frequency corresponding to the propagation velocity of said waves in the fluid, a second pair of transducers located on opposite sides of said pipe, a second means interconnecting said second pair of transducers for transmitting acoustic waves through the fluid in a second different direction and for producing oscillations having a frequency corresponding to the propagation velocity of the acoustic waves in said second direction, third means for combining the oscillations produced by said first and second means for producing a series of pulses having a pulse repetition rate proportional to the flow velocity of the fluid, fourth means including an electroacoustic transducer mounted in said pipe for producing an electrical quantity proportional to the density of the fluid and means connected to said third and fourth means for adjusting the amplitude of said pulses to a value proportional to the density of the fluid, and measuring means responsive to said pulses for measuring the average current of said pulses and indicating the rate of mass flow of the fluid and for measuring the total current of said pulses and indicating the total mass flow of the fluid.

5. Apparatus according to claim 4, wherein said measuring means includes a first condenser and a second condenser, means responsive to said pulses for charging said condensers, means for clamping one of said condensers to a point of fixed potential while leaving the other condenser free to charge in response to said pulses, means connected to said condensers for comparing the voltages thereacross to a fixed reference voltage, means for producing a pulse when the voltage across either condenser reaches the reference voltage, means responsive to said last means for causing said clamping means to unclamp said one condenser and to clamp the other condenser to said fixed potential and counting means responsive to said pulse producing means.

6. Apparatus according to claim 5, wherein said clamping means includes a relay and means responsive to said pulse producing means for unclamping said one condenser during the time required for said relay to operate.

7. Apparatus according to claim 6, wherein said counting means includes an input circuit controlled by said relay.

8. Apparatus according to claim 4 wherein the fourth means include a piezoelectric crystal mounted in said pipe in acoustic contact with the fluid, an oscillator connected to said crystal, means for series-resonating said crystal, and means for deriving a direct voltage proportional to the oscillatory voltage across said crystal and for applying said direct voltage to the means for adjusting the amplitude of the pulses proportionally to the density of the fluid.

9. Apparatus according to claim 8, wherein said series-resonating means includes an inductor, and means for varying the output of the oscillator to compensate for the effect of the resistance of the inductor on the voltage across the crystal.

10. Apparatus according to claim 8, wherein the means for adjusting the amplitude of the pulses include means for controlling the amplitude of said direct voltage so as to compensate for the loading of the piezoelectric crystal by its mounting.

11. Apparatus for measuring the mass flow of a fluid comprising first means including an electroacoustic transducer in acoustic contact with the fluid for producing a voltage proportional to the density of the fluid, second means including electroacoustic transducers in acoustic contact with the fluid for producing a first electrical quantity proportional to the velocity of flow of the fluid, third means connected to the outputs of said first and second means for producing a second electrical quantity proportional to the product of said voltage and first electrical quantity and means connected to the output of said third means and responsive to said second electrical quantity for producing an indication of the mass flow of the fluid.

12. Apparatus for measuring the mass flow of a fluid comprising first means including an electroacoustic transducer in contact with the fluid for producing a direct voltage proportional to the density of the fluid and substantially independent of the velocity of acoustic propagation in the fluid, second means including electroacoustic transducers in contact with the fluid for producing a periodic voltage having a period proportional to the velocity of flow of the fluid, third means connected to said first and second means for adjusting the amplitude of the periodic voltage to a value corresponding to the magnitude of said direct voltage and means connected to said third means for integrating the adjusted periodic voltage and indicating the mass flow of the fluid in response to the value of the integrated periodic voltage.

References Cited in the file of this patent

OTHER REFERENCES

| | | |
|---|---|---|
| 2,767,582 | Bartelink | Oct. 23, 1956 |
| 2,772,567 | Boden et al. | Dec. 4, 1956 |